ANALOG TO DIGITAL CONVERTER

Filed June 28, 1963 3 Sheets-Sheet 1

INVENTOR.
PHILIP E. SHAFER

July 4, 1967 P. E. SHAFER 3,329,950

ANALOG TO DIGITAL CONVERTER

Filed June 28, 1963 3 Sheets-Sheet 3

INVENTOR.
PHILIP E. SHAFER

United States Patent Office 3,329,950 Patented July 4, 1967

3,329,950
ANALOG TO DIGITAL CONVERTER
Philip E. Shafer, Holmes, Pa., assignor to Burroughs Corporation, Detroit, Mich., a corporation of Michigan
Filed June 28, 1963, Ser. No. 291,364
12 Claims. (Cl. 340—347)

This invention relates to an analog to digital information conversion system, and more particularly, to an analog to digital conversion system having a cascaded plurality of identical analog amplifying stages, each supplying one bit of a reflected binary result.

Automatic control systems which utilize electrical signals as interconnecting links often send phenomena such as temperature, speed, height, weight, etc. in the form of an electrical analog signal. That is, the phenomena is manifested by a continuous electrical signal, the amplitude of which, at any given time, is indicative of the degree or level of the function being monitored. It is often desired that the compilation and analysis of this information be performed by a data processing system of the digital type. The conversion of the analog information of the control system to the digital information required by the digital computer necessitates the use of an analog to digital converter.

There are a number of methods of converting a continuous DC voltage or current into digital form such as counting methods, feedback methods, and coding tube methods. These methods have been adequately described in the literature and are well known in the data processing art. The method which is presented herein has not been as well covered as the above methods, however, it was partly covered in an article entitled "An Unusual Electronic Analog Digital Conversion Method" by Blanchard B. Smith, Jr., published in the June 1956 issue of the IRE Transactions on Instrumention on page 155 and briefly referred to in the text "Digital Computer Components and Circuits" by R. K. Richards, published by D. Van Nostrand Company, 1957, pages 492 and 493.

The present invention utilizes a reflected binary code (known as the Gray code) to derive a result wherein the desired number of digits determines the required number of cascaded identical stages. While this basic method has been referred to and published, the method as originally presented had neither the speed nor the accuracy of the system which is disclosed in the present application. Further, this increase in speed and accuracy over the above references is achieved while reducing the complexity of the system. This improved system has been brought about by a modification which enables the desired digital characteristics of the Gray binary code to become an inherent part of the analog signal.

The inclusion of the binary signals within the analog signal accomplishes this increase in operating speed by operating all analog stages within their linear operating range. Former conversion systems of this cascaded stage type have usually operated separate binary signal paths within each stage. For example, each stage simultaneously coupled its incoming analog signal to both an analog and a binary signal path. The analog path would create the analog signal to be fed to the input of the next succeeding cascaded stage. A separate binary path would create the binary contribution of that stage to the converter binary result.

The circuits of the binary path in these former systems were driven in a switching mode whereby a circuit operated only in its cut-off or saturated condition. It is well known that operation in the saturated condition involves a time delay in which a relatively long time is required to return a saturated circuit to its active condition. This time delay, sometimes called storage delay, has been eliminated by the present concept.

The improved accuracy of the present device is achieved in part, by a unique method of measurement. It is well known that analog to digital converters require some form of reference so that a comparison may be made between the reference level and the unknown analog signal. In converters of the multi-stage type, which includes the present device, successive comparisons are made by each stage and therefore require a reference level in each stage. If the analog signal voltages present in each stage are of the same magnitude, a single reference level may be commonly connected to all stages. However, in this type of converter, each stage inherently produces an output analog voltage equal to only one half of its input voltage. To offset this reduction each stage must introduce a gain of two to allow the use of a common reference level.

As an alternative to the increase in stage gain, the reference voltage may be halved as it is applied to each successive stage. Thus, the reference voltage applied to second stage would be one half the magnitude of the first stage reference voltage. The third, fourth, fifth, etc., stages would receive reference voltages equal to ¼, ⅛, and 1⁄16 of the first stage value. This alternative method, of course, has the inherent disadvantage of requiring a number of different reference voltages, thereby defeating the prime purpose of any reference level.

The present invention utilizes a single reference voltage commonly applied to all stages of the converter. Further, rather than the usual method of a stage by stage comparison of the analog voltage with the reference voltage, there is a summation of the reference voltage with the absolute value of the input analog voltage by a single ended operational amplifier. This results in a comparison between the voltage summation and ground or zero reference level. Thus, the stability advantage associated with a single ended (one side grounded), operational amplifier as opposed to one having a balanced input (neither side grounded) is combined with the inherent stability of a zero voltage reference level.

It is important to note here that although the explanation of the system operation would suggest that the analog signal to be measured is passed from one stage to another, with each successive stage making its measurement before it is passed to the next stage, that such is not the case. System operation is not a series of successive measurements, it is rather a simultaneous measurement by all stages. The explanation in terms of stage succession is merely for purposes of simplicity. For example, any reference to an amplifier signal transfer characteristic will indicate that for a particular input signal level there exists simultaneously a corresponding output. If this simultaneous output becomes the input for the following stage, it is easily seen that the output of any number of cascaded stages is a simultaneous reaction based on a corresponding input to the initial stage.

Thus for each point of the input analog voltage to the initial stage, there exists, simultaneously, in each cascaded stage, a corresponding analog and binary voltage.

Each stage of the present invention has an analog output voltage which is centered around a zero reference voltage level and has the same peak to peak amplitude limits as its analog input voltage.

This similarity between analog output and input amplitude range and reference is the key that suggests the iteration of identical stages. That is, the direct coupling of output of one stage to the input of the next. Further, regardless of the number of stages which are cascaded, the analog output voltage of the last stage is identical in range and reference as the original input analog voltage. Thus, so long as the original analog voltage is operative in the linear region of the first input stage, the signals coupling between, as well as those within, identical stages throughout the system will likewise be operative only in linear range.

Each stage also possesses a digital output indication. This signal is taken directly from the output connection of one of two linear analog amplifiers within each stage of the system. The binary indication is introduced into the analog signal by the analog signal and is accomplished by the internal switching between a pair of alternate feedback paths. A diode switch within each feedback loop causes a feedback gap between the activation of one inverse loop and the inactivation of the other to create a binary indication at each critical zero reference voltage crossing of the analog input signal.

In summary, the converter system is created by cascading a group of identical amplifying stages. Each stage is a continuously operating device functioning entirely within its linear range. It possesses a voltage transfer characteristic which produces an output signal having a rate of change equal to twice its input. However, the output signal has an amplitude range equal to the input signal. This apparent inconsistency is resolved by inverting the second half of the output signal. For example, for a given input signal going symmetrically from negative to positive, the output signal for the first half of the input between negative and zero is in phase with its input. However, for the second half of the input signal from zero level to a positive level, the output signal is 180° out of phase with its input. This causes a peak in the output as the input voltage passes through the zero voltage. This characteristic is accomplished by having a stage gain of two, and reflecting the second half of the signal. The output signal returns to its original voltage level thereby creating an inverted V as the input signal passes from its negative voltage limit to its positive voltage limit. This return of the output signal to its original level at the end of a full range input sweep is one of the features which enables the cascading of stages. Additional stages merely repeat the operation, each making a two to one increase in the sweep rate between its input and output analog signals.

This increase in the speed of the analog signal enables a corresponding increase in the number of measuring increments or resolution of the analog signal. Each stage doubles the number of increments it receives. The first stage creates a binary digit to indicate whether the input analog signal is below (0) or above (1) the zero voltage input reference level. The second stage further divides each of these initial increments in half. The binary zero is divided into 0 and 1, and the binary one into 1 and 0. The latter two digits are a reflection of the former, since as previously explained the system utilizes a reflected binary or Gray code. The third stage divides the four increments from the second stage into eight. It is seen, therefore, that the number of increments in the final stage of any such system will be equal to a power of 2, which power is equal to the total number of stages.

In the present case of a 12 stage converter, the number of increments would be equal to $2^{12}$ or 4096 divisions. This is equivalent to a resolution of 1 part in 4096 parts or .025%. The operational speed necessary for an accuracy of such magnitude is readily apparent. If, for example, the input signal had a frequency of 1000 c.p.s., corresponding to a full input amplitude sweep in one half cycle or 500 microseconds, the frequency of operation necessary in the 12th stage digital output (corresponding to 11th stage analog output) is 4 megacycles, or 2048 times the input. The full input amplitude sweep to the 12th stage is, therefore, 250 nanoseconds.

It is therefore a primary object of this invention to provide a faster, more acurate, analog to digital conversion system having a configuration which is less complex than existing systems.

It is still another object of the present invention to provide a new improved analog-to-digital converter having a novel interconnection enabling the use of repetitive unity gain stages without the usual need for various reference voltages by each stage.

It is still another object of the present invention to provide a new and improved analog-to-digital converter capable of continuously following an analog signal, without the need for timing, synchronizing, or resetting operations.

It is still another object of this invention to provide an analog to digital converter having a cascaded plurality of identical stages each having a peak output amplitude equal to its peak input amplitude, enabling linear operation of each stage at all times.

It is still another object of the present invention to provide an analog to digital converter in which a normally closed, highly negative, feedback loop associated with an amplifier within each stage of the converter is opened as the input signal voltage to the stage passes through zero in either direction enabling such amplifier to provide its maximum open loop gain to the input signal, during the period that the signal is in the vicinity of a zero reference level.

Various other objects of the invention will be pointed out in the following description and claims and illustrated in the accompanying drawings which disclose by way of example, the principle of the invention and the best mode which has been contemplated of applying the principle. The invention, itself, however, both as to organization and method of operation may be best understood by reference to the following description taken in connection with the following drawings, wherein:

Figures 2, 4:
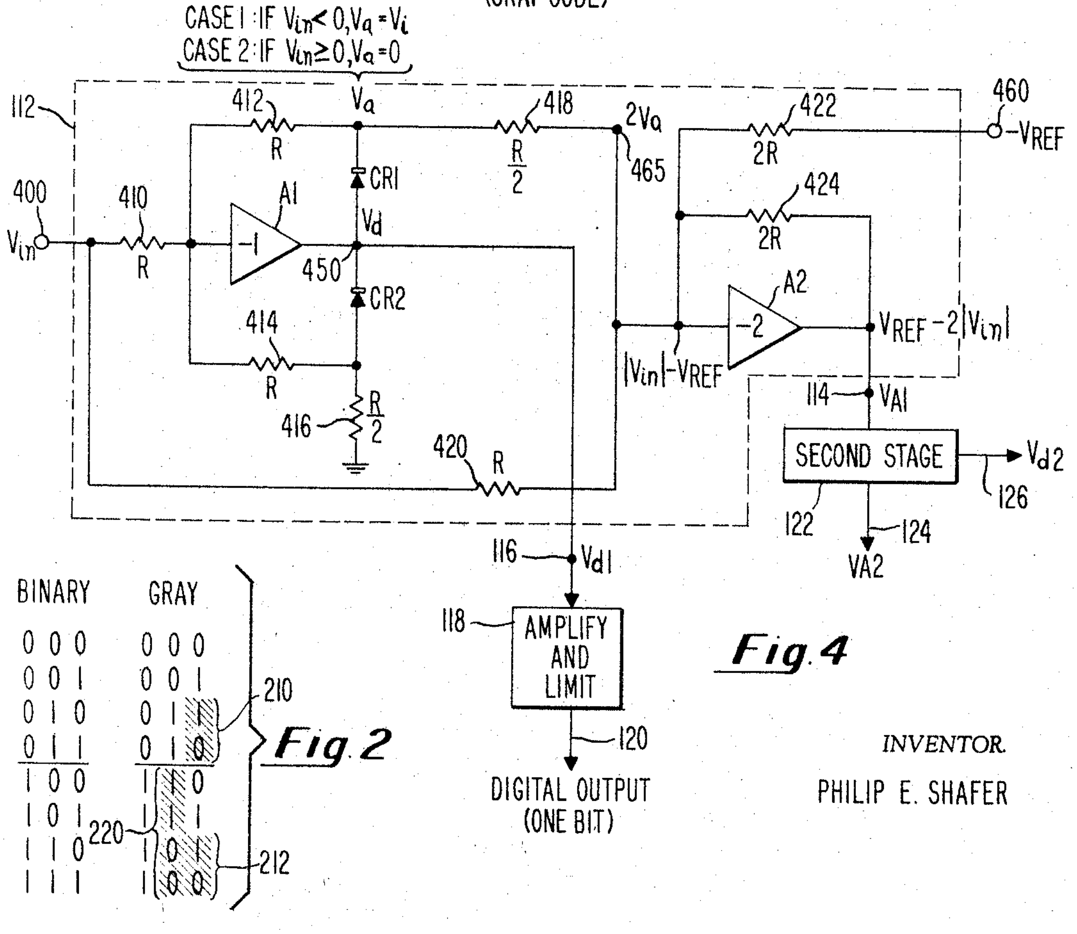
FIGURE 2 is a table comparing the standard binary code with a form of reflected binary code known as the Gray code.
Figure 5:
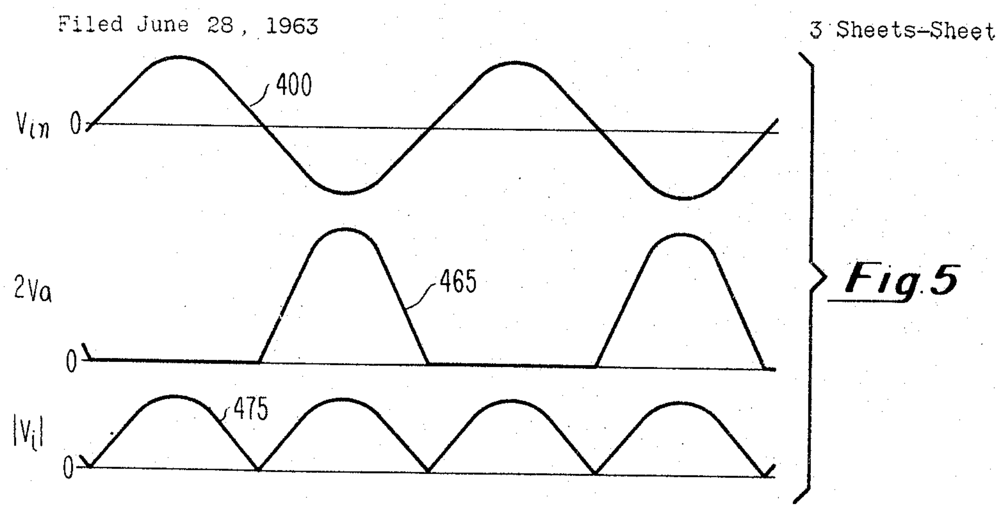
Figure 6A:
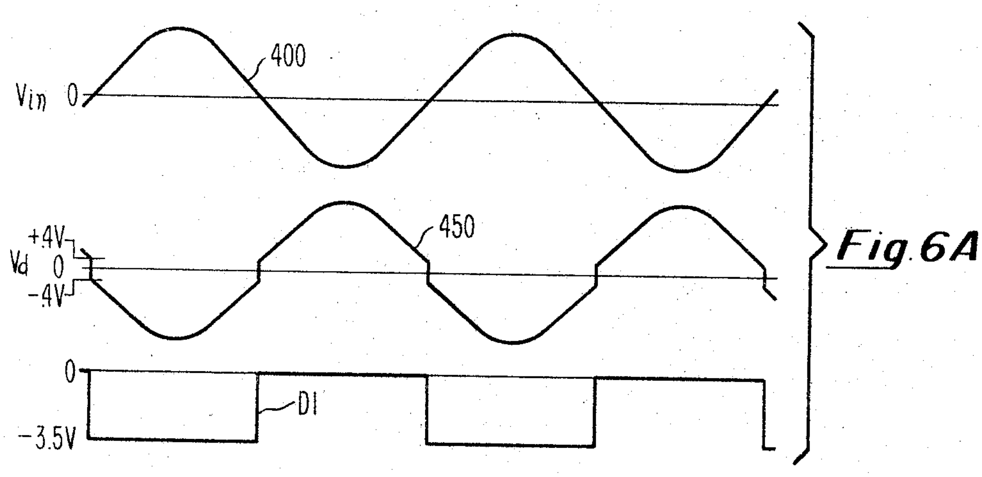
Figure 6B:
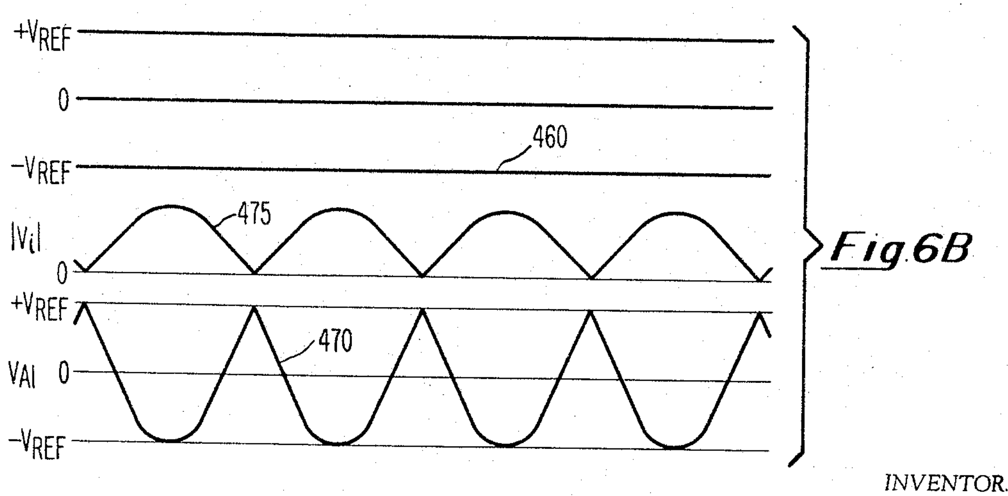

FIGURE 4 is the interconnection diagram of a single stage of the present converter system disclosed herein. The system contains a plurality of such stages. Each stage has a pair of inverting operational amplifiers A1 and A2. Amplifier A1 schematically shows the diode feedback system;

FIGURE 5 is a set of three signal voltage waveforms showing the creation of the composite input signal to the second amplifier A2;

FIGURES 6A and 6B each illustrate a set of voltage waveforms. FIGURE 6A showing the creation of the binary and FIGURE 6B, the analog output voltage of the stage.

The present invention utilizes a pair of operational amplifiers in each stage of the system. Such an amplifier is a basic circuit in analog computers. It is, in many respects, an ordinary negative output DC amplifier with its operational characteristics derived from the application in which it is used. In the present instance, feedback connections are employed to cause the output voltage to bear a specific mathematical relationship to the input voltage. Thus, the amplifier herein might be viewed as performing a mathematical operation. Since an operational amplifier may contain many separate circuits, it may be of the inverting or non-inverting type. In the present instance, both operational amplifiers are inverters.

As an example of the mathematical relationship involved, an operational amplifier may be used to add two or more voltages. Thus, to accomplish the addition of voltages E1, E2, and E3, each is coupled through a separate, corresponding resistor R1, R2, and R3, respectively to a common connection. The common terminal is then connected to the input terminal of an operational amplifier. If the voltages are equal ($E1=E2=E3$) and of the same polarity and the resistances are also equal ($R1=R2=R3$), the amplifier output voltage E0 is equal to the sum of the three input voltages multiplied by the gain (G or −G) of the amplifier or $$E0=E1+E2+E3(\pm G)$$

However, if the input voltages are not of the same polarity, the voltages will be added algebraically.

In the present invention, conversion of the analog signal is accomplished by applying it to a cascaded plurality of identical analog amplifying stages and taking from each stage a single binary output. The final parallel digital result at any particular time being a number of bits, one from each digital output, equal to the number of cascaded stages. This digital result is in a reflected binary form known as the Gray code. The Gray code is a type of reflected binary code having in each significant column a bit order in the bottom half which is a mirror reflection of, or reverse of the bit order of the top half of the same column.

While the system of conversion presented herein is based upon the Gray code, one can be constructed using the same basic principle, for standard binary code. In fact, the present system, with a modest amount of additional circuitry, may be made to do so without an increase in delay time. However, to obtain, for example, a conversion from analog to an excess −3 coded decimal system minor modifications to the present configuration would be necessary.

The operation of the converter is essentially analog and the digital outputs, although essential to the present application, are incidental in the sense that if the zero comparison and the logic circuitry shown are omitted, the internal operation of the system is unaffected.

Figure 1:
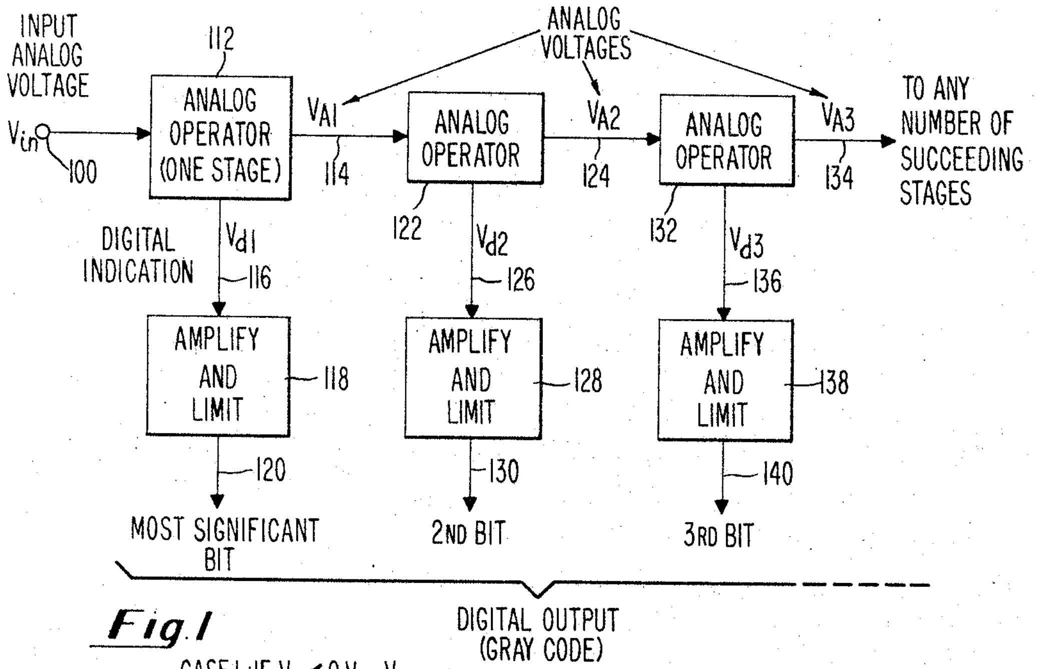
FIGURE 1 is a block diagram of the analog to digital conversion system as envisioned by the preferred embodiment of the present invention.

Referring in particular, to FIGURE 1 there is shown a block diagram of the converter system as presented herein. The analog input voltage to the system 100 is coupled to the first converter stage 112, which will generate both an analog voltage 114 and a threshold or binary indication signal 116.

It is this binary indication signal 116 which, when amplified and limited by circuit 118, is the source of the most significant bit 120 of the digital output.

The output analog voltage 114 from the stage 112 is the result of fully rectifying, in the negative direction, the analog input signal 100, then doubling its amplitude and finally recentering the negatively rectified, double amplitude signal about the zero voltage reference level. This recentering enables the second stage 122 or any following stage to receive an analog input signal having the same amplitude range as the first stage and possessing the same voltage reference. Thus any point on the analog signal input to any stage may be specified by referencing or comparing it to ground or zero voltage. This zero comparison characteristic replaces the comparison with a reference voltage inherent in every stage of all previous converters of this type. Its constancy throughout the system results in a major improvement in accuracy. The stage description just given for stage 112 is identical for all stages throughout the conversion system. Each stage creating a digital output from the analog input signal which is coupled into the stage. Thus, the digital operation of each stage is the binary indication of each analog amplitude sweep. Each sweep being a 0, 1 in the positive direction and a 1, 0 in the negative. The location of the stage in the cascaded string will determine its significance in the final digital result. The initial stages, being the more significant, change less often than the latter stages which increase the resolution possible by their rapidly changing notice of tiny increments. Any number of succeeding stages may be added for the desired number of bits and resolution is limited only by the accuracy of the circuits generating the stage characteristic.

The digital outputs 120, 130, and 140 as shown at the bottom of FIGURE 1, are generated initially in the form of a binary code known as the Gray or reflected binary code which along with the conventional binary code is given in the table shown in FIGURE 2.

Examination of the Gray code of the table in FIGURE 2 will reveal that it is developed by "reflecting" in its lower half, the reverse sequence of upper half binary digits. Further, the shaded bits referenced as 210 and 212 in the third column (least significant digit) are a reflection of the two bits immediately preceding them. Thus, going from left to right, toward the less significant digit columns each "reflection" in a column is again equally divided in the column to its right to contain a lower half which is a reflection of its upper half. The number of reflections, therefore, double with each less significant column. Reflections are never present in the most significant column.

In the conventional binary code repetition replaces reflection. Thus, in the conventional binary code, any column, reading top to bottom, having the second, or lower half, a repetition of its upper half. Here again, as in the case of reflections with the Gray code, repetitions are never present in the most significant column.

The most significant bit column is the same in both the conventional binary and the Gray codes. This is always true, since the initial input signal is the same in both cases and the first determination is merely a denoting of sign. In the second conversion, and thereafter, the codes result from different stages and consequently differ in form.

In summary, the bit repetitions in a column of the standard binary are replaced by bit reflections in the Gray code. The columns of most significant bits of both codes are the same. All other columns of the Gray code are a reflection below the center line of those bits of the same significance above the center line. In going from the more toward the less significant columns, each column of the Gray code has twice the number of reflections that the more significant column immediately to its left possessed. The result is symmetry about the center between the reflected and the unreflected regions of any column.

The Gray code has another property which makes its use extremely attractive. It possesses the advantage of unit distance step variation. That is, two adjacent bit words differ in only one bit position. This is true for any number of bits, and it is in this respect that the Gray contrasts greatly with the conventional binary code. For, at the middle of the list, the conventionary binary code tabulated on the left side of FIGURE 2 shows the binary word on either side of a horizontal center line to differ in all bits. A plot of such a characteristic would be a straight line having an upward slope toward a peak. This peak would be the center of the column. Immediately after the peak, there is a vertical step downward and return to the initial level. An example of such a waveform would be the commonly referred to "sawtooth function." In the case of the Gray code, the middle of the table so far as bit changes are concerned is exactly the same as any other part, only one bit changes in going from one word to the next. There exists an entire class of unit distance codes. The one presently chosen has been selected for the ease with which it can be converted to conventional binary.

Figure 3:
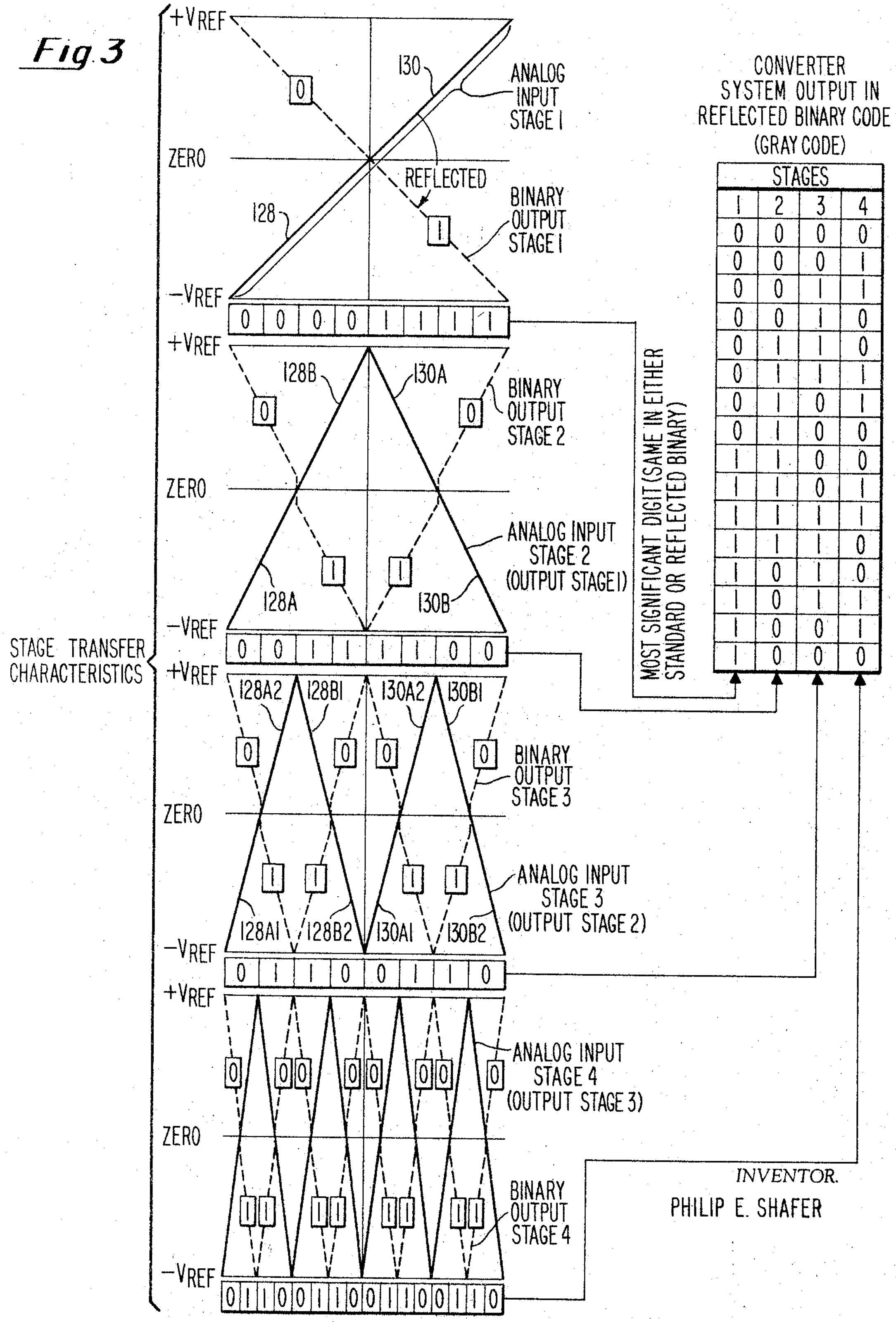
FIGURE 3 illustrates the transfer characteristic curves of the first, second, third and fourth cascaded stages in the present conversion system, indicating, in each, the analog input signal for creation of the binary signal (dashed) and the analog output to be coupled as the input signal to the following stage.

Refer next to the FIGURE 3. These four plots are voltage transfer characteristic graphs of various stages of the converter system.

It is felt that system operation may be best explained by the use of these transfer characteristics of the stages. A transfer characteristic is, of course, a graph in which the output voltage is plotted against the corresponding input voltage. Usually the output voltage is plotted vertically for a corresponding horizontal input voltage.

The top curve of FIGURE 3 is a transfer characteristic which represents a unity gain characteristic. Lines 128 and 130 represent the entire characteristic. The dual reference numerals 128 and 130 for the bottom and top half of a single line are for purposes of explanation. An inverted or reflected characteristic of 130 would be the same as the lower dashed line. The top plot is one having both a plus and a minus representation for both the input voltage±V*in* and the output voltage±V*out*. It may be considered to be divided into four quadrants for ease of communication. The lower two quadrants being negative input and upper two positive input signals. The left hand two negative, and the right hand two, positive output signals.

Starting clockwise from the lower left hand corner, the four quadrants are therefore: (1) negative input and output; (2) negative input and positive output; (3) positive input and output; (4) positive input and negative output.

The solid line referenced as 128 and 130 represents a transfer characteristic having unity gain. This is, the case wherein the output voltage is equal to the input voltage. Line segment 128 is the non-inverting representation of negative input voltages resulting in corresponding negative output voltages. Line 128 terminates at the center point of the figure wherein both the input and the output voltages are equal to zero, and the line 130 is initiated to illustrate a second representation of non-inversion wherein a positive input voltage creates an equally positive output voltage.

If, in this second non-inverting case, the transfer characteristic were of the inversion type, the output voltage created in response to the positive input voltages would be as shown by the dashed line referenced as 130 reflected in the lower right hand corner quadrant.

The combined characteristic would be the linear plot starting at the lower left hand corner and reaching a peak at the center intersection 0, 0 of the horizontal and vertical co-ordinates, and thereafter decreasing linearly toward its original output voltage.

The second half would be a mirror reflection of the first half, creating a characteristic in the shape of an inverted V. Since this is the inverted V shaped transfer characteristic which has been shown previously to be required to create the Gray code, a device having such a characteristic is necessary for use in each stage.

A transfer characteristic such as that shown by line 128 in the top plot of FIGURE 3 would be indicative of an amplifier having unity gain without inversion. Normally, where a single element of amplification results in a voltage inversion, it is well known, the addition of a second such element will produce an amplifying means without inversion.

Therefore if this two element device is used for negative input signals (below zero), since no inversion is involved, the output is, as shown by reference 128, in phase with the input. However, if only a single element of the two element device were used for positive input signals (above zero), the inversion will result in the out of phase output signal shown by reference 130 reflected.

The overall stage gain is two, however, because of the inversion of the second half of the input signal, the input and output analog signals have equal peak to peak amplitudes.

An additional gain of two is imposed on the half wave rectified signal coupled from the first to the second amplifier. This increased signal is re-combined with the original input signal and a negative reference voltage at the input to the second amplifier. Since the increased signal has, in addition to being doubled, undergone inversion and half wave rectification; the re-combination results in a fully rectified version of the original input signal going in a positive direction from a fixed negative reference voltage. The second amplifier inverts and doubles this input signal to create a stage output signal going in a negative direction from a fixed positive reference voltage an amount equal to twice the absolute value of the original input signal or $Vout=+Vref-2\ Vin$.

If the magnitude of the negative reference voltage applied to the input of the second operational amplifier is chosen equal to one half of the full range of input analog voltage swing or V*n* down from the positive (inverted negative) reference level will swing between +V*ref* and −V*ref* and consequently be centered around a zero reference level. This re-centering of the output analog signal about zero voltage level results in equality of amplitude and reference level between input and output. The process of full wave rectification, as would be expected, causes a doubling of the repetition rate between output and input signals.

The top two graphs of FIGURE 3 illustrate the input and the output voltages of the first stage of the converter. The solid transfer characteristic lines throughout FIGURE 3 indicate analog voltages. The dashed lines indicate the analog output signal of the first operational amplifier containing the required binary output voltage levels. The line formed by 128 and 130 in the top figure starting in the lower left hand corner of the graph and moving diagonally to the upper right hand corner is the original input analog voltage to be converted to binary digits. Examination of its peak to peak amplitude will reveal that it has a lower (starting) limit of −V*ref* and an upper limit of +V*ref*. Thus, it has full range of 2 V*ref* which is centered at the zero voltage reference level. There are, of course, two outputs from each stage. A binary output shown in the top figure by the dashed diagonal and an analog output shown below as the solid lined inverted V. The amplitude of this inverted V is equal to the original input, since its lower limit (starting) is −V*ref* and its upper limit (center peak) is V*ref*.

Ordinarily, the reflection of the upper portion of the input curve 130 would give an upper limit of zero volts, however, by doubling the gain of the stage, the output triangle amplitude is made equal to the original input. Recentering of this triangle about zero is accomplished by the addition to each stage of a negative reference voltage equal to one half of the original analog peak to peak amplitude.

The important feature to be noted is the creation of an output analog voltage which has traversed a given amplitude range twice in the same time that the input signal accomplished are transversed. Thus, the dashed binary output of the first stage, corresponding to the original input, is capable of indicating that the input analog signal is in the upper or the lower half of its full amplitude range (above or below zero voltage).

In the second stage, each half covered by a single binary digit in the first stage, is now subdivided into two parts. Thus the input amplitude range is now divided into four parts, corresponding to four binary digits. This dividing in half of each segment received by each stage results in a doubling of the segments available.

The third transfer characteristic shown in FIGURE 3 represents the analog input voltage to the third stage. Comparison with the corresponding characteristic to the second stage reveals the creation of a full triangle by the second stage for half triangle it received. Thus the line reference as 128A and B which represents the input voltage to the second stage is expanded into a full triangle as shown by reference lines 128 A1, A2 and 128 B1 and B2 as the input to the third stage. This third stage input voltage, is, of course, the same voltage referred to as the second stage output voltage. Thus the binary 0 created by 128A is divided into the two binary digits by stage 2, wherein characteristics 128 A1 and 128 A2 of stage 3 input correspond to binary 0 and 1. The second stage has therefore divided the input analog voltage into 8 parts to be able to specify into which of the eight parts it resides. The number of parts is, therefore, equal to the base 2 raised to a power which is designated by the number of stages.

The transfer characteristic of each identical stage is obtained by the circuit shown in FIGURE 4. The first stage as shown contains two chopper stabilized operational amplifiers A1 and A2. Both amplifiers A1 and A2 are designed for a three or four megacycle closed loop cutoff frequency with a 0.5 to 0.6 microsecond settling time to within 0.01% accuracy. The frequency characteristics of the amplifiers, including the transistor choppers which stabilize them, are so tailored that long time transients, such as would be present with a step input voltage, will never exceed the specified settling time of the amplifier itself.

Each of the two amplifiers shown in the FIGURE 4 as A1 and A2 is a high gain inverting operational amplifier designed for stability when operated at low gain by the application of heavy inverse feedback in a closed loop.

The amplifier A1 is operated at unity gain by either one of a pair of feedback paths. One of the pair is operative for negative input signals to the amplifier, while the other takes over for positive inputs.

The negative feedback path through resistor 412 is completed when positive signals at the output 450 of amplifier A1 activate diode CR1. This corresponds to a negative input voltage due to inversion by the amplifier.

The alternate feedback path is through diode CR2 and resistor 414. This path is completed when CR2 is activated by negative output signals at 450 corresponding to positive input signals to amplifier A1.

The voltage V*d* at the output point 450 of A1 is the source of digital signals from each stage. Close observation of this point will reveal that there exists a range of output voltage levels during which the amplifier is completely without feedback. This happens after diode CR1 opens and before diode CR2 conducts and vice versa. This open feedback loop period occurs when the input voltage and correspondingly inverted output voltage is in the vicinity of zero.

For example, consider FIGURE 6A in conjunction with FIGURE 4. Assume that the diodes CR1 and CR2 are of the same type and both require a forward bias voltage of .4 v. in order to become conducting. The top waveform of FIGURE 6A is the input voltage at point 400 in FIGURE 4. Below it is the output voltage of A1 at point V*d*. When the output voltage at point V*d* goes below +.4 v., corresponding to an input voltage of −.4 v., diode CR1, which has been conducting, opens and the amplifier A1 is without inverse feedback. This high gain condition will continue until the output voltage has passed downward through zero and reached a negative voltage of −.4 v., corresponding to an input voltage of +.4 v. At this point, the diode CR2 will be sufficiently forward biased to conduct and activate the alternate inverse feedback loop through resistor R14.

During this period when the output voltage is between +.4 v. and −.4 v. at point V*d*, the gain of the amplifier will be extremely high and the output waveform as a result contains sudden, sharp amplitude jumps in the vicinity of zero crossings by the input and output analog voltages. Since these sudden amplitude steps correspond to zero crossings and since, as previously discusssed, it is these crossings of the zero voltage level by the stage input voltage that creates the digital output shift from one binary number to the other, these amplitude steps are utilized to create the stage binary output voltage.

It should be emphasized that the voltage gain of the operational amplifier A1 is unity. The doubling of the half wave rectified output voltage from amplifier A1 is accomplished by halving the input summing resistor 418 (*R*/2) to the input of amplifier A2. Thus as to this rectified input the gain of the amplifier A2 is $2R \div R/2$ or 4.

Thus, as to the input juncture 465 of operational amplifier A2, the output voltage from operational amplifier A1 when CR1 is conducting is 2V*a*. This voltage 2V*a* is the original input voltage V*in* after it has undergone positive half wave rectification and doubling. Resistor 420 couples the input voltage V*in* to the second operational amplifier A2. This is the only path used during the positive portion of the input voltage, since during this time the amplifier A1 output is negative and consequently the diode CR1 is non-conducting.

Refer now to FIGURE 5 in which is shown a set of three voltage waveforms. Each waveform represents the voltage occurring simultaneously at various points on the individual stage of the converter shown in FIGURE 4. The top trace represents the input voltage V*in* at juncture 400. The center trace illustrates the voltage 2V*a* at the point 465. This second waveform 2V*a* is the consequence of inversion by the first operational amplifier A1, half wave rectification through the diode CR1, and doubling of the positive half cycle by reducing resistor 418 to one-half the value of 420 as indicated in FIGURE 4. The signal used as an input voltage V*in* in all waveforms herein is a 1000 cycle sine wave. It was chosen as a result of analysis based on system design specifications. Since the present system was designed for a time resolution of 1/10th of a second and a delay of about one microsecond, it was determined that dynamic accuracy measurements could be made using a 1000 c.p.s. sine wave signal having a full scale amplitude of 8 v. peak to peak. This input approximated a pure sine wave corresponding to a maximum slope of about $12 \times 10^6$ quantum per second.

Since the cutoff frequency of the amplifiers used is 4 megacycles, the maximum frequency of measurement is correspondingly limited.

Thus for 12 bit accuracy, the number of measurements required is $2^{11}$ or 2048 (the 12th stage binary output corresponding to the analog output of the 11th stage). This is equivalent to approximately 2000 measurements for each peak to peak swing of input signal amplitude. In the case of 1000 c.p.s. a peak to peak range occurs every one-half cycle or every 500 microseconds. To obtain 2000 measurements in 500 microseconds requires that they be taken every .25 microsecond which of course corresponds to the cutoff frequency of 4 megacycles per second.

The creation of both digital and analog output signals by each stage is demonstrated by the waveforms in FIGURES 6A and 6B. FIGURE 6A illustrates the digital and FIGURE 6B, the analog output voltage of a stage. The top voltage waveform in FIGURE 6A is the input voltage V*in* shown at juncture 400 of FIGURE 4. It is an 8 v. (*p*–*p*), 1000 c.p.s. sine wave signal. The center waveform is the voltage V*d* at output juncture 450 of the first amplifier A1. The zero crossing points of this waveform shows the sudden voltage jumps as the gain of the amplifier soars without its inverse feedback voltage. This, of course, occurs during the switching period between diode CR1 becoming non-conducting and CR2 starting to conduct causing the amplifier gain to seek its open loop value. It is this abrupt change in voltage which is externally amplified and limited by additional well known and after used logic circuitry 118 of FIGURE 4 to give the bottom digital waveform of FIGURE 6A. It has levels of approximately −3.5 and zero volts for positive and negative voltage input respectively. The analog waveforms of the first stage are shown in FIGURE 6B. The top trace is the fixed reference voltage +V*ref*, which is equal to one-half of the full scale amplitude of the input signal V*in*. To obtain this positive reference voltage a negative reference voltage −V*ref* is combined with the input signal V*in* in its fully rectified form V*in*. This fully rectified form of V*in* will be referred to as the absolute value of V*in* or V*in*. This amplifier A2 inverts both the fully rectified signal (positive) and the reference voltage (negative). As to the dynamic signal, the gain of an operational summing amplifier corresponds to the ratio of the feedback resistor 424 to the signal input resistors 418 and 420, the gains are $2R \div R/2 = 4$ and $2R \div R = 2$, respectively. However as to the fixed reference signal, it is noted that the resistor 422 coupling this voltage to the input is also 2R. This indicates that the gain of the stage as to that reference voltage is unity. The output, therefore, is as shown by the bottom waveform of FIGURE 6B wherein the fully rectified input signal *Vin* in its positive form is doubled 2 V*in* and inverted —2 V*in*. The reference voltage is also inverted from the negative reference input —V*ref* to the positive output +V*ref* as shown. The entire signal in its final output form is therefore V*ref* —2 V*in*.

The center waveform of FIGURE 6B is the fully rectified or absolute value of the input voltage V*in* and is noted as V*in*. It results from combining the signal 2 V*a* which, as previously mentioned, is the positive portion of the input sine wave V*in* doubled after the input signal has been half wave rectified, and the input signal V*in* at point 465 of FIGURE 4 and results in the peak to peak input signal V*in* in its fully rectified form. The bottom trace of FIGURE 6B is the final analog output V1A of the first converter stage as indicated at juncture 470 in FIGURE 4. As previously discussed, it is a consequence of doubling and inverting the fully rectified input signal V*in* and combining it with the —V*ref* inverted reference voltage.

Summarizing, the advantage of the circuit shown in FIGURE 4 lies in the high speed and accuracy with which the absolute value V*in* of the input analog voltage V*in* is generated. The high accuracy being mainly attributed to the extremely rapid switching function performed inside the feedback loop by the conduction transfer between diodes CR1 and CR2. This enables the error caused by the voltage drop across the diode to be made as small as desired by using high amplifier gain. Modern silicon diodes are presently available with leakage current so low that an error from this source would be regarded as negligible, or, of course, by vacuum diodes, where an even lower leakage is permissible.

Since the output is the unit distance of Gray scale, each increment in the analog voltage will cause the switchover of only one stage of the converter. The outputs of all other stages will change, if at all, only small increments. The high speed of the device is attributable to a number of features. For one, all amplifiers are operative entirely within their linear range eliminating completely saturation delays usually associated with digital operation. A second feature is the manner of interconnection used within each stage enabling single amplifiers to perform both analog and digital functions.

The present embodiment represents a design for continuous conversion of an analog input signal to Gray binary code with 12 bit accuracy and an uncertainty in time of less than .2 of a microsecond between the digital reading and the analog value to which it refers.

Since the reference voltage required will have a fixed load associated with it in each of the amplifier stages, a very simple standard source voltage may be used. For example, a single reference type Zener diode is entirely satisfactory.

The general system of converting analog signals to Gray binary code by cascading stages is not limited to the disclosed device but may be used in a variety of broad applications. Relaxation of the speed and accuracy requirements would, for example, result in considerable savings by a direct reduction in complexity.

This conversion system, also, could be accomplished in a series fashion wherein the output could be repeatedly coupled back to its input. The number of repetitions to determine the accuracy, since it corresponds directly to the number of stages. That is, 12 repetitions would be equal to a 12 stage device, the only difference, of course, existing in the time required for the final result.

In fact, the basic circuitry of a single stage as shown in FIGURE 4 could be used separately as an extremely accurate absolute value measuring device for analog signals.

Digital to analog conversion, which is, of course, the reverse conversion process, can be done by using the above scheme in a feedback system. The digital input to the digital to analog converter is compared with the digital output of the analog to digital converter. So long as the digital output is smaller than the digital input, the analog output of the digital to analog converter is increased. This could be accomplished for example, by charging a capacitor. When coincidence occurs, the analog voltage as stored in the capacitor is the correct analog value of the digital input.

It should therefore be apparent to one skilled in the art that while only one illustrative embodiment of the invention has been described herein, that numerous other arrangements of components may be devised without departing from the spirit and scope of the invention.

What is claimed is:

1. A multi-stage, linear amplifying, successive comparison, analog to digital converter in which each stage comprises: a first inverting amplifier having discontinuous negative feedback means, a second inverting summing amplifier and a voltage reference receiving means, said first and second amplifiers having a pair of input terminals and a pair of output terminals, said input terminals of both amplifiers to receive a bipolar stage input analog voltage, the output terminals of said first and said second amplifiers to produce the digital and analog output voltage signals from said stage, further interconnecting means between the discontinuous negative feedback means of said first amplifier and the second amplifier input terminals, said second amplifier input terminals also connected to said voltage reference receiving means, said stage to thereby provide a binary output indication from said first amplifier output corresponding to the polarity of said bipolar input analog signal and providing further a bipolar analog output voltage from said second amplifier having twice the rate of change of the input analog voltage while maintaining the same amplitude range and reference.

2. The claim as set forth in claim 1 wherein each stage of said converter has a zero reference ground bus having a plurality of terminals connected thereto, one of said plurality being associated with each of said input, output, and voltage reference terminals of said stage and with each of said input and output terminals of said amplifiers whereby a zero voltage reference is commonly shared by all of said terminals.

3. An analog to digital converter comprising: a plurality of analog signal, linear amplifying stages serially connected together in a cascaded string, each of said stages having analog input terminals, analog output terminals, fixed reference voltage input terminals, and digital output signal terminals, the analog output terminals of each of said stages connected to the analog input terminals of a following stage, the fixed reference voltage terminals of all stages commonly connected together to receive a fixed voltage reference, each stage further having a pair of amplifiers with input and output terminals, said input terminals of both amplifiers connected to receive bipolar input signals from said stage analog input terminals, the output terminals of one amplifier continuously connected to said stage digital output terminals, discontinuously connected to its own input terminals and unidirectionally discontinuously connected to the input terminals of said second amplifier, said input terminals of said second amplifier also connected to the voltage reference terminals of said stage, the output terminals of said second amplifier connected to the stage analog output terminals, whereby said group of stage digital output terminals are capable of producing, substantially simultaneously, a plurality of binary signals equal to the number of stages of said converter, said binary signals providing a reflected binary number equivalent to the magnitude of an analog voltage applied at the input terminals of the first stage in cascaded string.

4. The claim as set forth in claim 3 wherein said first inverting amplifier has a gain of unity when said feedback means is continuous and a gain approaching infinity when said feedback is discontinued.

5. The claim as set forth in claim 4 where said second amplifier has a simultaneous voltage gain ratio of two, for the stage analog input voltage; four, for the discontinuous signal received from said feedback means of said first amplifier, and; one, for the voltage reference voltage applied at said receiving means.

6. The claim as set forth in claim 5 wherein one input terminal of each amplifier is connected directly to a zero voltage reference terminal, enabling said amplifiers to use said zero voltage as a reference level for purposes of comparison.

7. The claim as set forth in claim 6 wherein the amplifiers are operational amplifiers and said various gain ratios are resistively determined by the ratio of a negative feedback resistor connected between the output and input terminals of the amplifier to a resistor connected in series with the particular input connecting line.

8. The claim as set forth in claim 7 wherein said first and second operational amplifiers are operated entirely at their linear conduction range to thereby eliminate the operation of said amplifiers in their saturated conduction regions whereby the speed of operation of said converter is improved.

9. The claim as set forth in claim 8 wherein the discontinuous feedback means is a pair of opposing polarity diode means connected from the output terminal of said first amplifier through separate series resistors to the input terminal of said first amplifier.

10. A linear amplifying stage providing a bi-polar analog and a digital output signal from a single bi-polar analog input signal comprising:

two amplifiers for an overall gain of four, the first of said two amplifiers having automatically discontinuous negative feedback means to thereby impart sudden variations in output signal amplitude corresponding to said discontinuities;

circuit means including said first amplifier for receiving a bi-polar analog input signal for providing said stage digital output signal;

further circuit means connected to said second amplifier for providing three input voltages to be compared to a zero voltage reference source, said three input voltages being a stage bi-polar analog input voltage, a uni-polarized portion of the output signal from said first amplifier, and a received fixed reference source voltage;

said further circuit means including a first coupling resistor for receiving said bi-polar analog input voltage and a second coupling resistor for receiving said uni-polarized portion of the output signal from said first amplifier, the resistance of said second resistor being substantially half that of said first resistor so as to effectively double the input voltage amplitude from said first amplifier to thereby impose a gain of four by said second amplifier as to that input signal.

11. The claim as set forth in claim 10 wherein the fixed reference voltage applied to said second amplifier is set equal to one half of the peak to peak range of the analog input voltage to said stage to thereby effectively reproduce at said stage analog output an analog voltage whose peak to peak amplitude is centered about a zero reference level thereby providing an analog output voltage of identical amplitude range and reference as said input voltage.

12. A signal converting device to provide the reflected binary output signal equivalent of a received bipolar analog input signal, said device comprising a plurality of single bit stages, serially connected, output to input, each stage having first and second signal inverting amplifiers, said second amplifier connected to receive analog input signals of either polarity, said first and second inverting amplifiers being cascaded for analog input signals of one polarity to simultaneously produce at the output of said second amplifier an analog output signal having twice the magnitude and the same phase as the input signal, said cascaded connection being automatically severed by input analog signals of opposite polarity, said second inverting amplifier producing an analog output signal having twice the magnitude of said input signal of opposite polarity and said output signal being out of phase with its input, thereby providing at said stage analog output, a signal having the same absolute value as the input analog signal.

References Cited

UNITED STATES PATENTS 2,660,618 11/1953 Aegrain ............ 340—347

DARYL W. COOK, *Primary Examiner.*

MALCOLM A. MORRISON, MAYNARD R. WILBUR, K. R. STEVENS, W. J. KOPACZ, *Assistant Examiners.*